United States Patent [19]
de Carbon

[11] 4,369,864
[45] Jan. 25, 1983

[54] SHOCK ABSORBER INCLUDING THERMOSTATICALLY CONTROLLED FLUID FLOW PASSAGE

[76] Inventor: Christian B. de Carbon, 64, Boulevard Maurice-Barres, 92 Neuilly-sur-Seine, France

[21] Appl. No.: 214,529

[22] Filed: Dec. 8, 1980

Related U.S. Application Data

[63] Continuation of Ser. No. 35,544, May 3, 1979, abandoned.

[30] Foreign Application Priority Data

May 5, 1978 [FR] France .............................. 78 13303

[51] Int. Cl.³ .............................................. F16F 9/52
[52] U.S. Cl. .................................. 188/277; 236/101 R
[58] Field of Search ............... 188/276, 777, 316, 269; 267/129; 236/93 R, 101 R

[56] References Cited

U.S. PATENT DOCUMENTS

| | | | |
|---|---|---|---|
| 2,087,426 | 7/1937 | Bechereau et al. | 188/277 |
| 2,196,436 | 4/1940 | Briggs | 188/276 |
| 2,719,612 | 10/1955 | De Previnquieres . | |
| 2,821,268 | 1/1958 | de Carbon | 188/277 |
| 3,088,555 | 5/1963 | Karlgaard | 188/276 |
| 3,104,552 | 9/1963 | Bouchard | 188/316 X |
| 3,722,640 | 3/1973 | Taylor | 188/316 |
| 3,844,389 | 10/1974 | de Carbon . | |
| 4,048,905 | 9/1977 | Souslin | 188/316 |
| 4,132,395 | 1/1979 | Fox, Jr. | 188/269 X |

*Primary Examiner*—George E. A. Halvosa
*Attorney, Agent, or Firm*—Watson, Cole, Grindle & Watson

[57] ABSTRACT

A hydraulic shock absorber includes a split ring surrounding the piston head and being mounted thereon so as to maintain a slight radial play between the ring and the shock absorber casing, and to maintain a slight longitudinal play between the ring and the piston head. Radially extending flanges on the piston head support the ring in place in a longitudinal direction. A longitudinal channel defining a flow passage for the hydraulic oil between opposite sides of the piston head is defined by a space between opposed free ends of the ring and between the inner wall of the casing and the periphery of the piston head. The ring is capable of expanding under elevated temperatures to an extent causing the space between the free ends thereof to vary so as to change the size of the passage and to control the dampening effect.

11 Claims, 8 Drawing Figures

U.S. Patent   Jan. 25, 1983   Sheet 1 of 2   4,369,864
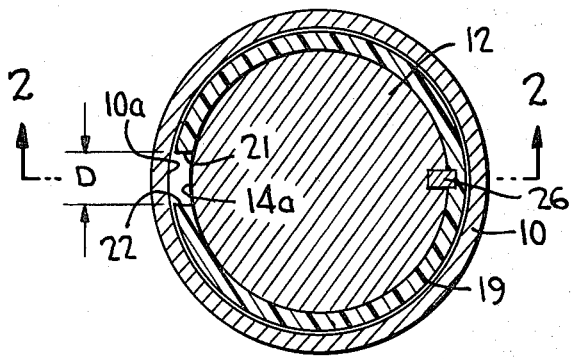
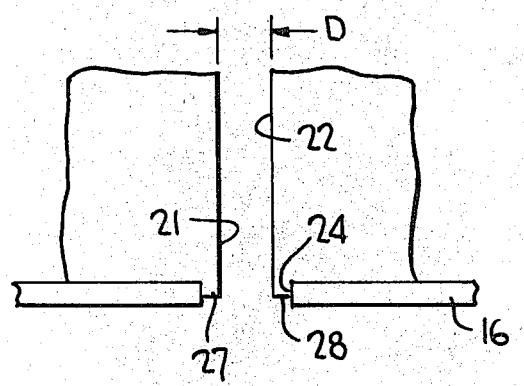
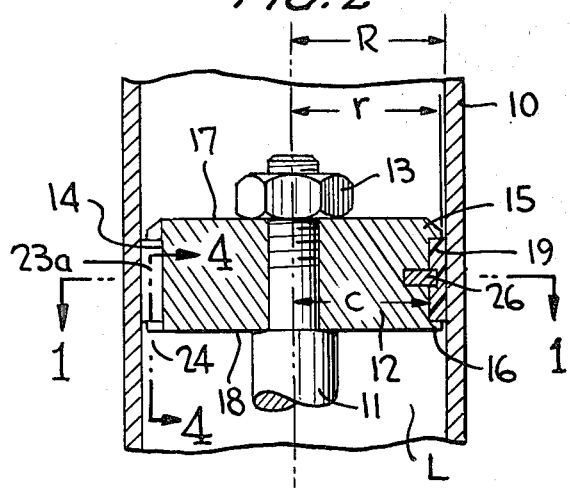
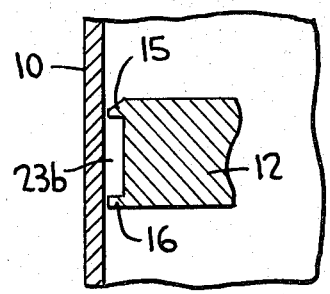
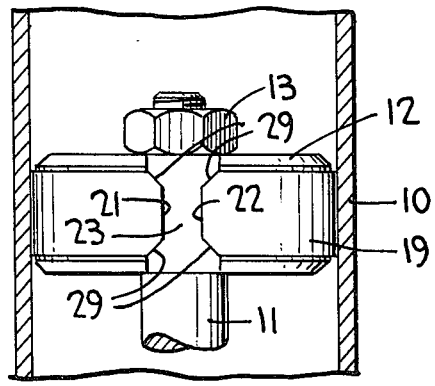
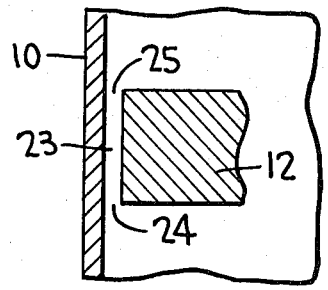

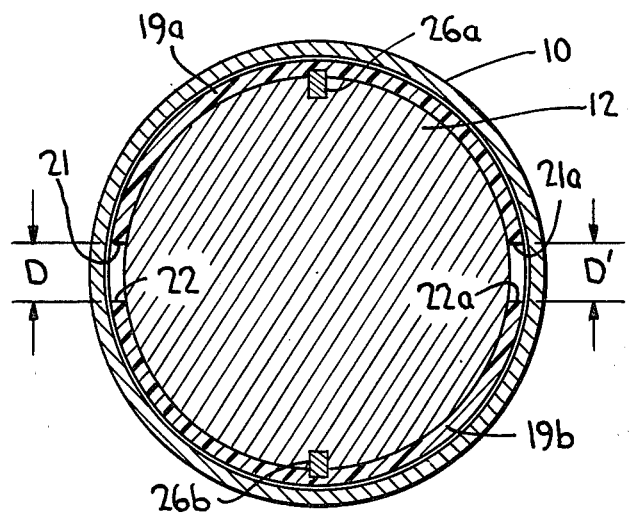
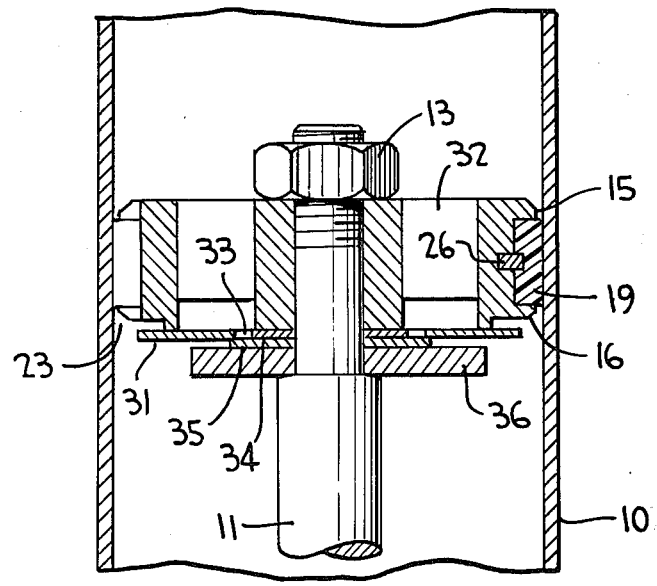

SHOCK ABSORBER INCLUDING THERMOSTATICALLY CONTROLLED FLUID FLOW PASSAGE

This is a continuation of application Ser. No. 035,544, filed May 3, 1979, now abandoned.

BACKGROUND OF THE INVENTION

This invention relates generally to shock absorbers, and more particularly to shock absorbers of the fluid displacement type adapted especially for use on automotive vehicles, although usable in cushioning or braking shocks sustained by other devices and mechanisms.

Pistons for hydraulic shock absorbers of this type include valves which are caused to open more or less as a function of the difference in pressure on opposite sides of the piston head within the working chamber contained by the shock absorber casing. Oil passages controlled in such manner are normally complemented by the provision of additional passages which are not valved, such additional passages being typically referred to as "permanent passages."

These permanent passages function to effect a more comfortable ride when the shock absorber is used in connection with vehicle wheel spring suspensions. The cross-section of these permanent passages should, however, be comparable to the valved oil passages when open by the valves during reciprocation of the piston at a moderate speed.

The shape of these permanent passages is also important for effecting a more comfortable ride, and it is known that thin slits defining such passages produce a greater degree of comfort as compared to round holes. Permanent passages defined as round holes effect a sudden change from a laminar flow to a turbulent flow which therefore modifies the discharge rates and takes place much more rapidly and frequently than with the use of thin slits having the same cross-section.

However, resistance to the flow of hydraulic fluid through thin slits varies greatly in accordance with the viscosity of the hydraulic fluid used in the shock absorber. Therefore, those shock absorbers having permanent passages formed in the piston thereof in the shape of thin slits have an efficiency which diminishes substantially upon an increase in temperature of the piston. This, in practice, is an unacceptable drawback.

In order to diminish this loss of efficiency with rising temperatures, hydraulic fluids of low viscosity have been selected, although this has not been found a satisfactory solution because the low viscosity oils facilitate and increase the frequency of the sudden and uncontrolled changes from laminar flow to turbulent flow. This loss of efficiency from temperature factors is not, moreover, completely corrected by using a low viscosity oil, and this phenomenon, which affects many presently designed shock absorbers, has not yet been satisfactorily solved, even when the permanent passages are defined by round holes.

SUMMARY OF THE INVENTION

A shock absorber has been devised in accordance with the present invention which makes it possible to achieve perfect compensation for temperature, even when using a permanent passage in the shape of a thin slit and an oil of relatively high viscosity. The shock absorber of the invention prevents to the greatest extent possible the occurrence of turbulent flow, the prevention of which is necessary for achieving the greatest possible comfort when the shock absorber is used in connection with vehicle wheel spring suspensions.

In carrying out the invention, a split ring having a high coefficient of expansion surrounds the piston head and is maintained with a slight radial play between it and the shock absorber casing, and with a slight longitudinal free play between the ring and the piston head. The ring has at least one pair of opposed free ends spaced a predetermined distance apart, and the ring is held in place longitudinally by flanges extending radially of the piston. A longitudinal channel having a rectangular cross-section and in the shape of a slit is thereby defined by the space between such opposed ends and the space between the periphery of the piston and the inner wall of the casing. One or both of the flanges may have aligned notches in alignment with the space between the opposed free ends of the ring, or neither flange may be provided with notches at such space, depending on the size and extent of the longitudinal channel desired.

The ring, being of plastic material and having a high coefficient of expansion, will therefore increase in length as it expands during an increase in temperature, with the result that the opposed free ends of the ring will be brought closer together thereby resulting in a decrease in one of the dimensions of the longitudinal passage, i.e., a reduction in the cross-section of the channel.

The use of open rings made of a plastic material, for example, Teflon containing graphite or fiberglass, between the piston and the cylindrical casing of a shock absorber, have been provided in a suspension strut of the Mac-Pherson type wherein great lateral stresses of the piston against the cylindrical casing exist. Such open rings are provided for the dual purpose of yielding a better piston-sliding capacity and a more perfect seal between the piston and the cylindrical casing. The ends of such ring are coupled together in a particular design shape, and such rings are slit only to facilitate their installation in the housing which maintains them in place.

In my prior U.S. Pat. No. 2,719,612, a shock absorber is disclosed as having an annular ring made of a material sufficiently expansible for reducing the thickness of a laminating passageway provided in the piston to compensate for the loss in damping resulting from a reduction in the viscosity of the oil.

The present invention, as will be seen from the detailed description which follows, differs in function, operation and end result from the prior art suspension struts described above. Also, the permanent passage of rectangular cross-section is localized in accordance with the invention and the cross-section thereof changes upon elongation of the ring during an increase in temperature. No annular space or clearance is provided in the present shock absorber as in my prior U.S. Pat. No. 2,719,612 to facilitate the passage of fluid from one side of the piston to the other.

BRIEF DESCRIPTION OF THE DRAWINGS

FIG. 1 is a cross-sectional view of the piston and cylinder of a shock absorber according to the invention, taken substantially along the line 1—1 of FIG. 2;

FIG. 2 is a vertical sectional view taken substantially along the line 2—2 of FIG. 1;

FIG. 3 is a side elevational view of a piston head having a split ring thereon in accordance with another embodiment of the invention, the cylindrical casing being shown in section similar to that of FIG. 2;

FIG. 4 is an enlarged detailed view looking in the direction of arrows 4—4 of FIG. 2, showing a manner of preventing rotation of the ring relative to the piston head;

FIGS. 5 and 6 are partial sectional views, similar to that of FIG. 2, showing different embodiments of the piston head respectively having neither of its flanges notched and both its flanges notched;

FIG. 7 is a sectional view similar to FIG. 1 but showing the ring as having a pair of longitudinal channels formed by a pair of spaced opposed ends of two ring segments; and FIG. 8 is a vertical sectional view of a shock absorber having a floating flow control element with which the present invention is usable.

DETAILED DESCRIPTION OF THE INVENTION

Turning now to the drawings wherein like reference characters refer to like and corresponding parts throughout the several views, only those portions of the hydraulic shock absorber are shown which are necessary for a clear understanding of the invention. Thus, in FIG. 2, only a portion of a longitudinally extending cylindrical casing 10 is shown which typically encloses a working chamber containing a hydraulic liquid L characterized in this Figure as such in the interest of clarity. A piston is adapted to reciprocate in the working chamber, and includes a piston rod 11 and a piston head 12 connected to the rod as by means of a nut 13 threaded in place. An end of the piston rod extends outwardly of casing 10, and the rod and the casing are suitably mounted (not shown) in place for controlling the relative movements of a sprung body and an unsprung body. The piston head has a peripheral wall 14 and is generally of a suitable metallic material. This peripheral wall, as seen in FIG. 2, has a diameter less than the inner diameter of the casing, and a top annular flange 15 as well as a bottom annular flange 16 extend radially outwardly of the peripheral wall and lie at opposite sides 17 and 18 of the piston head. A split ring 19, of suitable thickness, surrounds the peripheral wall of the piston head, although incompletely, and is maintained substantially against axial shifting by means of flanges 15 and 16 lying at opposite ends thereof. These flanges together permit a very slight longitudinal free play, of about 0.1 mm, between the ring and the piston head. And, the outer diameter of the ring is about 0.1 mm less than the inner diameter of the casing so that a very slight radial free play is maintained between the ring and the casing. It should be pointed out that this radial and longitudinal free play facilitates an anti-friction means to thereby insure the smooth reciprocating movement of the piston. And, the very slight radial free play described above does not define an annular space or clearance in the form of a permanent passage through which fluid passing from one side of the piston to the other takes in the form of a thin film or lamination, as provided in my aforementioned U.S. Pat. No. 2,719,612.

Ring 19 is comprised of a material having a high coefficient of expansion, higher than the coefficient of expansion of the material from which the piston head is made. The ring material may be, for example, a flourine-based resin, an acetal resin or a polyamide, such as Teflon, Delrin, nylon, etc. The ring has opposed free ends 21 and 22 spaced apart (see FIG. 1) a predetermined distance D of, for example, 5 to 10 mm. The ring therefore incompletely encircles the periphery of the piston head. The space between free ends 21 and 22, and the space between portions 10a and 14a (FIG. 1) respectively of the casing in the peripheral wall, together define a longitudinal channel 23 having a rectangular cross-section and being in the shape of a slit having a width equal to the difference between inner radius R of the casing and outer radius C of the piston's peripheral wall, having a length D and a height equal to the distance between sides 17 and 18 of the piston head. Lower flange 16 may be notched as at 24 (FIGS. 4 and 6) in alignment with the spacing between ends 21 and 22, and upper flange 15 may be similarly notched as at 25 (FIG. 6) in alignment with the spacing between these free ends. Otherwise, a channel 23a may be defined as in FIG. 2 without the upper flange being so notched, but only the lower flange being notched at 24. The width of this channel 23a is thus defined by the difference between outer radius r (which is less than radius R) of the upper flange and outer radius C of the peripheral wall of the piston head. Further, a channel 23b is defined as shown in FIG. 5 with there being no notch in lower flange 16. The upper and lower flanges may be of different diameters, so that the width of channel 23b may be effected accordingly.

The longitudinal channel therefore defines a permanent passage for the control of the hydraulic fluid moving between opposite sides of the piston head during piston reciprocation. However, the size of this longitudinal channel will decrease under the effect of a temperature increase which causes ring 19 to increase in length. Opposed free ends 21 and 22 of the ring will therefore move closer together under the effect of such a temperature increase thereby resulting in a decrease in the dimension D of the thin slit, and consequently, a reduction in its cross-section. If the slit dimensions formed in this manner are properly chosen as a function of the coefficient of expansion of the ring, and if the piston valves (to be later described) are properly designed, it is possible to achieve a nearly perfect temperature compensation for the variations in the oil viscosity at all piston reciprocation speeds. The longitudinal channel designed in accordance with the invention effects a sizable passage of hydraulic fluid, well under control, so as to obtain a dampening effect independent of the temperature. The flow of hydraulic fluid through the longitudinal channel may be controlled by notching both flanges 15 and 16 as in FIG. 6, by not notching either flange and perhaps providing them at different diameters as in FIG. 5, or by notching only the lower flange as in FIG. 2. Also, the upper flange, only, may be notched instead of notching the lower flange.

With one or the other, or both, of the flanges notched in axial alignment with the spacing between ends 21 and 22, it is desirable to prevent ring 19 from rotating relative to the piston head. A small stud or pin 26 may be provided for this purpose, the pin being mounted in the piston head and extending outwardly of its peripheral wall into engagement with a suitably provided recess in ring 19 (see FIGS. 1 and 2). Alternatively, the ring may be prevented from rotating relative to the piston head by the provision of protuberances 27 and 28 (FIG. 4) which extent from the ring at the free ends thereof and bear against the respective sides of notch 24. Of course, these protuberances may similarly bear against the sides of notch 25.

As shown in FIG. 3, ends 21 and 22 of the ring may be beveled at their corners as at 29 for further controlling the passage of a hydraulic fluid through channel 23. And, opposed ends 21 and 22 of the ring may lie parallel to one another in the longitudinal direction of the piston, or may lie parallel to one another at an angle (not shown) to such longitudinal direction, if desired.

Although only a single longitudinal channel has been described, it should be pointed out that more than one longitudinal channel may be provided without departing from the invention. For example, as shown in FIG. 7, the ring may have another opposed pair of free ends 21a and 22a spaced a predetermined distance D' apart for defining another longitudinal channel in the same manner as described with reference to channel 23. A pair of ring segments 19a, 19b may therefore be provided for this purpose. And, pins 26a and 26b may be provided for preventing rotation of the ring segments relative to the piston head in the same manner as described with reference to pin 26. Further, the channel defined at spacing D' may be characterized without the provision of flange notches, with the provision of such notches, or with the provision of only one flange notch as described above.

FIG. 8 is similar to a FIGURE shown in my prior U.S. Pat. No. 3,844,389 disclosing a hydraulic shock absorber having a floating control valve. The entirety of the disclosure of U.S. Pat. No. 3,844,389 is therefore specifically incorporated herein by reference. The piston construction is the same as in this prior patent except that no permanent passages are provided in valve 31 as therein disclosed. Instead, the permanent flow passage is defined by a longitudinal channel 23 identical to that described in the foregoing Figures. And, axial passages 32 are provided in the piston head in communication with notches 33 provided in a centering washer 34. The notches are normally closed by means of a bearing washer 35 held in place by a retaining disc 36. The number of notches 33 provided is a function of the characteristics that are sought for the shock absorber and it is these notches alone which determine the section of the passage presented to the fluid when the inner edge of valve 31 begins to rise. The function and operation of the valved notches 33 are otherwise specifically described in the aforementioned '389 patent.

Obviously, many other modifications and variations of the present invention are made possible in the light of the above teachings. It is therefore to be understood that within the scope of the appended claims the invention may be practiced otherwise than as specifically described.

I claim:

1. A hydraulic shock absorber, comprising a cylindrical casing having an inner diameter enclosing a working chamber containing a hydraulic fluid, and a piston adapted to reciprocate in said working chamber, said piston including a piston rod and a cylindrical piston head connected to said rod, the hydraulic fluid being adapted to pass between opposite sides of said piston head during the reciprocation, a non-metallic ring surrounding the peripheral wall of said piston head, said ring comprising a material selected from the group consisting of a flourine-based resin, an acetal resin or a polyamide, said piston head being devoid of any permanent flow passages within the area delimited by said peripheral wall, said head comprising a material having a first coefficient of expansion, and said ring material having a coefficient of expansion higher than said first coefficient of expansion, circular flanges at said opposite sides of said piston head extending radially outwardly of said peripheral wall and having outer diameters slightly less than said inner diameter, said ring being discontinuous by having at least one pair of opposed free ends having parallel related walls extending in the direction of the longitudinal axis of said casing and being spaced a predetermined distance apart, said ring throughout its entire length extending radially outwardly of said flanges, said ring having an outer diameter which is slightly less than said inner diameter of said casing for solely insuring smooth reciprocating movement of said piston without defining any annular passage through which the fluid may pass between said opposite sides of said piston, at least one permanent open passage being located outwardly of said peripheral wall of said piston head through which fluid solely passes in permanent flow relation between said opposite ends of said piston to thereby control the dampening effect during reciprocation of said piston, said passage being delimited by said parallel walls, said outer diameters of said flanges, and said inner wall of said casing, and the space between said parallel walls varying with change in temperature of said ring to thereby solely change the size of said passage and to control the dampening effect.

2. The shock absorber according to claim 1, wherein said piston head is provided with axial valve controlled flow passages, and a floating double-acting valve means being operatively mounted on said piston head for regulating the dampening effect during the reciprocation of said piston.

3. The shock absorber according to claim 1, wherein said ring comprises a pair of ring segments having two pair of opposed free ends spaced apart from one another in each said pair, the respective spaces between said two pair of opposed free ends and between said outer diameters of said flanges and said inner wall of said casing defining two diametrically opposed longitudinal channels of a predetermined size for controlling the dampening effect during reciprocation of said piston, means cooperating between said ring segments and said piston being provided for preventing rotation of said segments relative to said piston head to thereby maintain said predetermined size of said channels, and said spaces varying with change in temperature of said ring to thereby change the size of said channels for controlling the dampening effect.

4. The shock absorber according to claim 3, wherein one of said flanges has notches therein aligned with said spaces between said free ends for varying the size, in part, of said longitudinal channels.

5. The shock absorber according to claim 3, wherein both said flanges have aligned notches therein in alignement with said spaces between said free ends for varying the size of said longitudinal channels.

6. The shock absorber according to claim 5, wherein said free ends of said ring segments have edges parallel to one another and bevelled corners for further varying the size of said channels.

7. The shock absorber according to claim 3, wherein said cooperating means comprise studs extending outwardly of said peripheral wall and engaging in recesses provided in said ring segments.

8. The shock absorber according to claim 3, wherein said cooperating means comprise protuberances provided on said ring segments in engagement with edges of one of said notches.

9. The shock absorber according to claim 1, wherein one of said flanges has a notch therein aligned with said space between said free ends for varying the size, in part, of said longitudinal channel.

10. The shock absorber according to claim 1, wherein both said flanges have aligned notches therein in alignment with said space between said free ends for varying the size of said longitudinal channel.

11. The shock absorber according to claim 10, wherein said free ends of said ring have edges parallel to one another and bevelled corners for further varying the size of said longitudinal channel.

* * * * *